36. BOOTS, SHOES & LEGGINS,
Sole-Attach
Prepare
22 R
36-22.R 54
EXAMINER.
Div. 11.
C. Mc Burney,
Shoe-Sole Machine,
No. 1,588, Reissued Dec. 8, 1863.
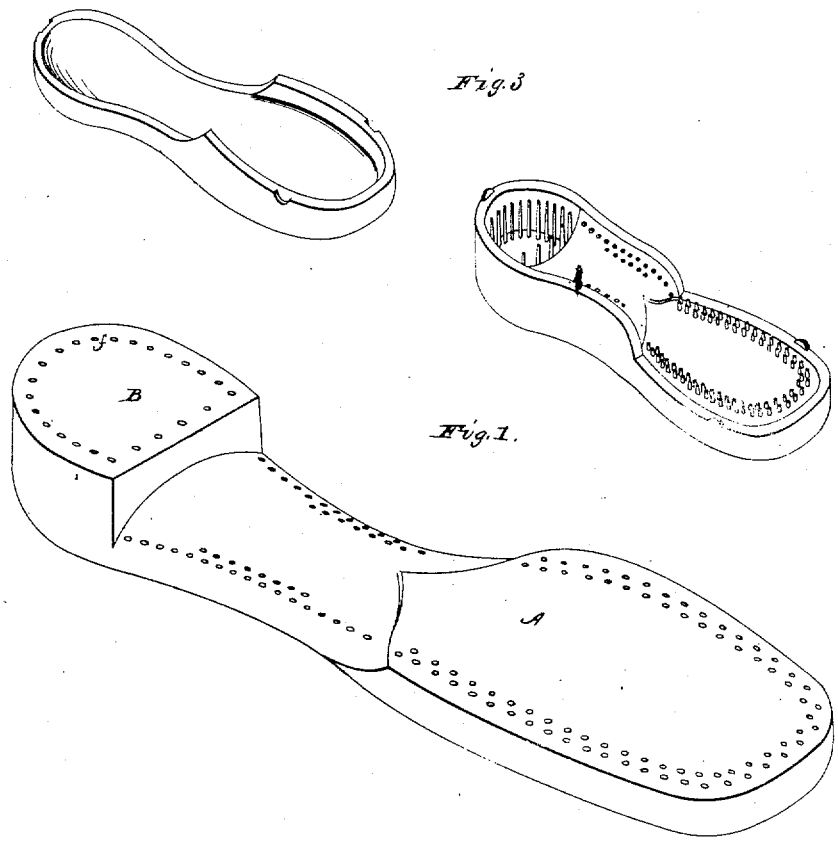
Fig. 2.
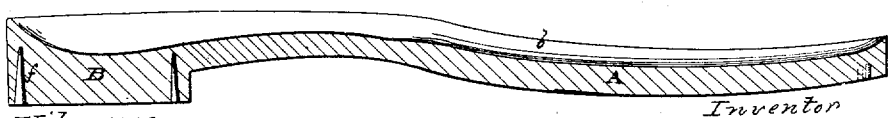
Witnesses
Wm. P. Roach
H. Teichmacher
Inventor
C. M. Burney
N. PETERS, PHOTO-LITHOGRAPHER, WASHINGTON, D. C.

UNITED STATES PATENT OFFICE.

CHARLES McBURNEY, OF ROXBURY, MASSACHUSETTS.

IMPROVED INDIA-RUBBER SOLE FOR BOOTS AND SHOES.

Specification forming part of Letters Patent No. 23,479, dated April 5, 1859; Reissue No. 1,588, dated December 8, 1863.

DIVISION A.

*To all whom it may concern:*

Be it known that I, CHARLES McBURNEY, of Roxbury, in the county of Norfolk and State of Massachusetts, have invented a new and useful Sole for Boots and Shoes, of which the following is a full, clear, and exact description, reference being had to the accompanying drawings, making part of this specification, in which—

Figure 1 is a view of the sole, seen from beneath; Fig. 2, a longitudinal section through the same; Fig. 3, a view of the two halves of the mold in which the sole is vulcanized.

My invention has for its object to make the soles of boots and shoes of india-rubber or other vulcanizable gums or the compounds thereof, these materials being particularly adapted to this purpose by their durability, elasticity, and imperviousness to water.

The attempt has before been made to form complete soles of india-rubber, which were secured to the boot or shoe by nails or pegs in a manner similar to that adopted for the purpose of securing the leather soles of ordinary pegged shoes. Such sole, however, when applied, was liable to the serious objection that the holes made for the pegs caused the edges of the sole to bulge out opposite to each peg. This gave to the sole an unsightly appearance which it was not found practicable subsequently to remove. Another difficulty attending the use of soles thus perforated subsequent to vulcanization is found in this, that the strength of the material is reduced just at the point where it should be the greatest. The strain upon the sole when in wear being at the surface of the pegs, every motion of the foot, and also the distension caused by the dirt which enters between the pegs and the sole, tends to tear the rubber. The slightest cut or puncture, exposing a fresh surface of rubber, extends rapidly; but in my improved soles every part is equally strong and durable, the rubber along the whole surface, including the holes to receive the pegs, being of closer texture or condensed by contact with the mold during the process of heating or vulcanization, which, as is well known, produces a pellicle or thin stratum that is tougher than the inner portion of the material.

My present invention consists in the production, as a new article of manufacture, of vulcanized india-rubber soles, or sole made of any other vulcanizable gums, adapted for attachment to boots or shoes by means of pegs, nails, rivets, or sewing—that is to say, by means other than cementation or adhesion, as hertofore used—which attachment does not involve the necessity of previously piercing or cutting holes; and my said invention further consists in a new manufacture of boots and shoes produced by combining with the uppers thereof a molded sole made of vulcanized india-rubber or other vulcanizable gum, when the latter is attached to the former by nails, rivets, or other metallic clinching devices, or threads applied in such a manner as will neither disfigure the shape nor require the piercing of the face or bottom of the sole after vulcanization.

In the accompanying drawings, the sole A and heel B are made of a single piece, and are manufactured ready to be applied to the boot. The upper surface, *b*, of the sole herein shown is formed to suit the shape of the foot, and this may be done much more perfectly than can be effected in leather. Both the sole and the heel are punctured through or nearly through with holes *f* for the pegs or nails. This is effected by pins *h*, attached to and making part of the mold, Fig. 3, in which the sole is vulcanized, and when it is to be applied to the shoe it is simply necessary to insert the pegs or nails into the holes *f* and drive them, the nails being slightly larger than the holes, that there may be sufficient adhesion between them and the india-rubber to hold the sole in place. I thus accomplish several very desirable ends: First, the workman employed is relieved of the labor of making the holes *f* for the pegs, and the time required for the operation is saved; secondly, the edge of the sole is not disfigured by the bulging of the material opposite to each hole, as is the case where the sole is vulcanized solid and the holes are subsequently punched; thirdly, the tearing or disintegration of the sole at or about the holes is prevented.

Either wooden pegs or metallic nails may be employed to secure the sole to the shoe, or the holes may be of a suitable size and depth to allow the sole to be attached by sewing.

The holes may be made slightly conical, in conformity with the shape of nails or pegs generally used. In some cases, particularly for thick soles, I prefer to close the holes at the top of the sole by means of a sheet incorporated with the sole of such thinness or by making the holes of such depth as that the introduction of the peg or nail shall have no effect on the shape of the sole, and prevent exposure of any cut or torn portion thereof.

In the manufacture of the above sole I prefer the following composition of materials: four to eight pounds india-rubber, one to four pounds sulphur, and twenty-five pounds scraps of cloth covered with vulcanized-rubber compound. This compound, after being suitably ground and mixed in the customary manner, is vulcanized by exposure to a temperature of 205° to 270° from one to four hours, or thereabout. These proportions may, however, be variously modified, and they form no part of my present invention. The sole may be made of various degrees of hardness by varying the proportions of the materials and the details of the vulcanizing process.

It is obvious that the sole and the heel may be made in one piece, or they may be made in separate and distinct pieces, or either one of them may be made of india-rubber and the other of leather or of other material.

It will be also understood that instead of nails or pegs, rivets or other mechanical means may be used for holding the sole to the uppers without departure from my said invention.

In conclusion, I would observe that this my invention does not relate to the mechanical means of attachment hereinbefore referred to, and that therefore I do not wish to be understood as claiming as my invention the mechanical means of attachment described or any mechanical means of attachment whatsoever; but—

What I do claim is as follows:

1. As a new manufacture, a vulcanized india-rubber sole, or sole made of any other vulcanized gum, adapted for attachment to boots or shoes by means of pegs, nails, rivets, or sewing, or other equivalent means, the sole being made in such manner that said attachment does not require any previous preparation of the sole by piercing or cutting holes.

2. As a new manufacture, boots and shoes produced by combining with the uppers thereof a molded sole made of vulcanized india-rubber or other vulcanizable gum, when the latter is attached to the former by nails, rivets, or other metallic clinching devices or threads applied in such manner as will neither disfigure the shape nor require the piercing of the face or bottom of the sole after vulcanization.

In testimony whereof I have signed this specification in presence of two witnesses.

CHARLES McBURNEY.

Witnesses:

EDWARD UPHAM,
JOHN G. TAPPAN.